Jan. 18, 1938.   H. F. PATTERSON   2,105,755
POWER TRANSMISSION
Filed Jan. 25, 1934   4 Sheets-Sheet 1
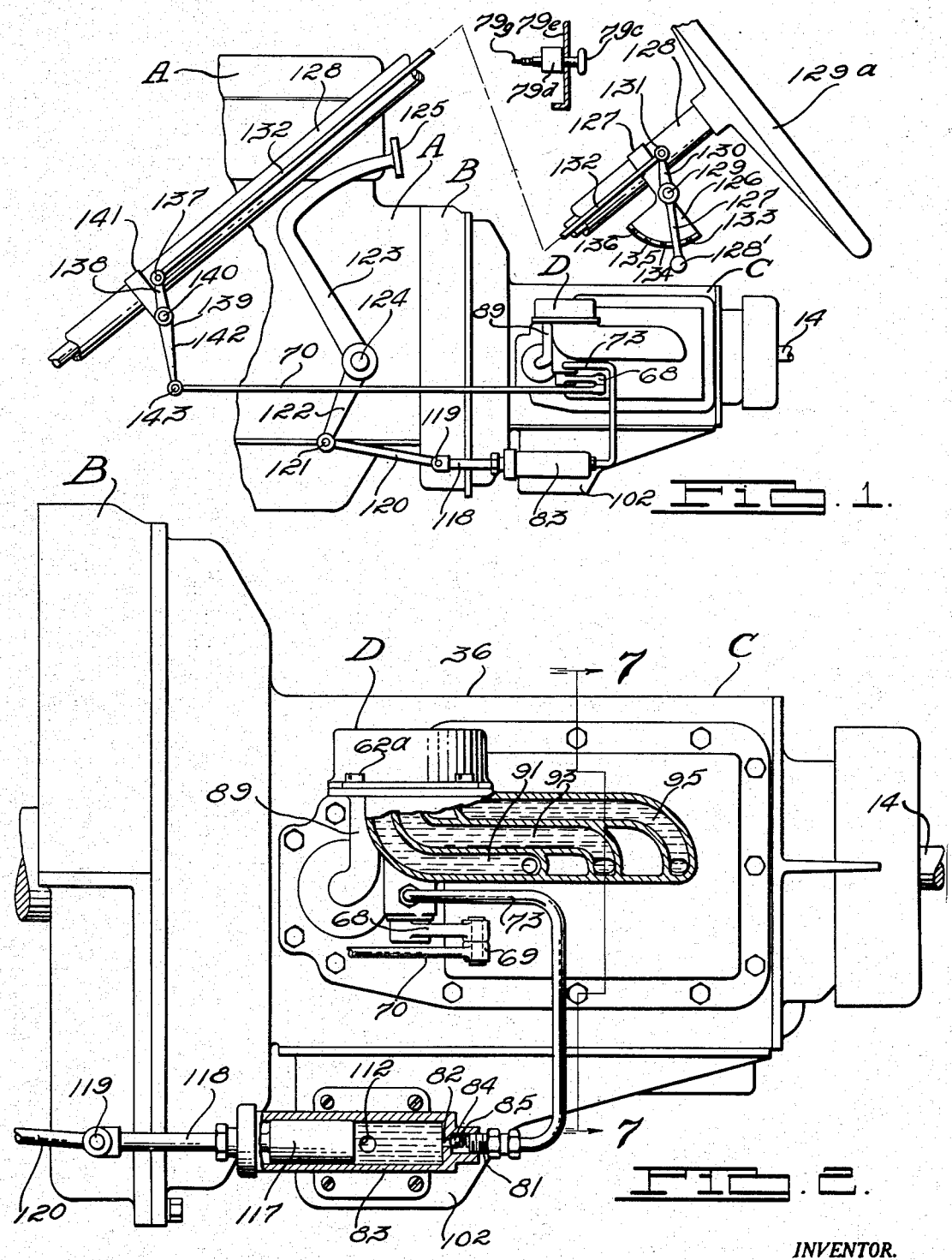
INVENTOR.
Herbert F. Patterson
BY
Harness, Lind, Pauel & Harris
ATTORNEYS

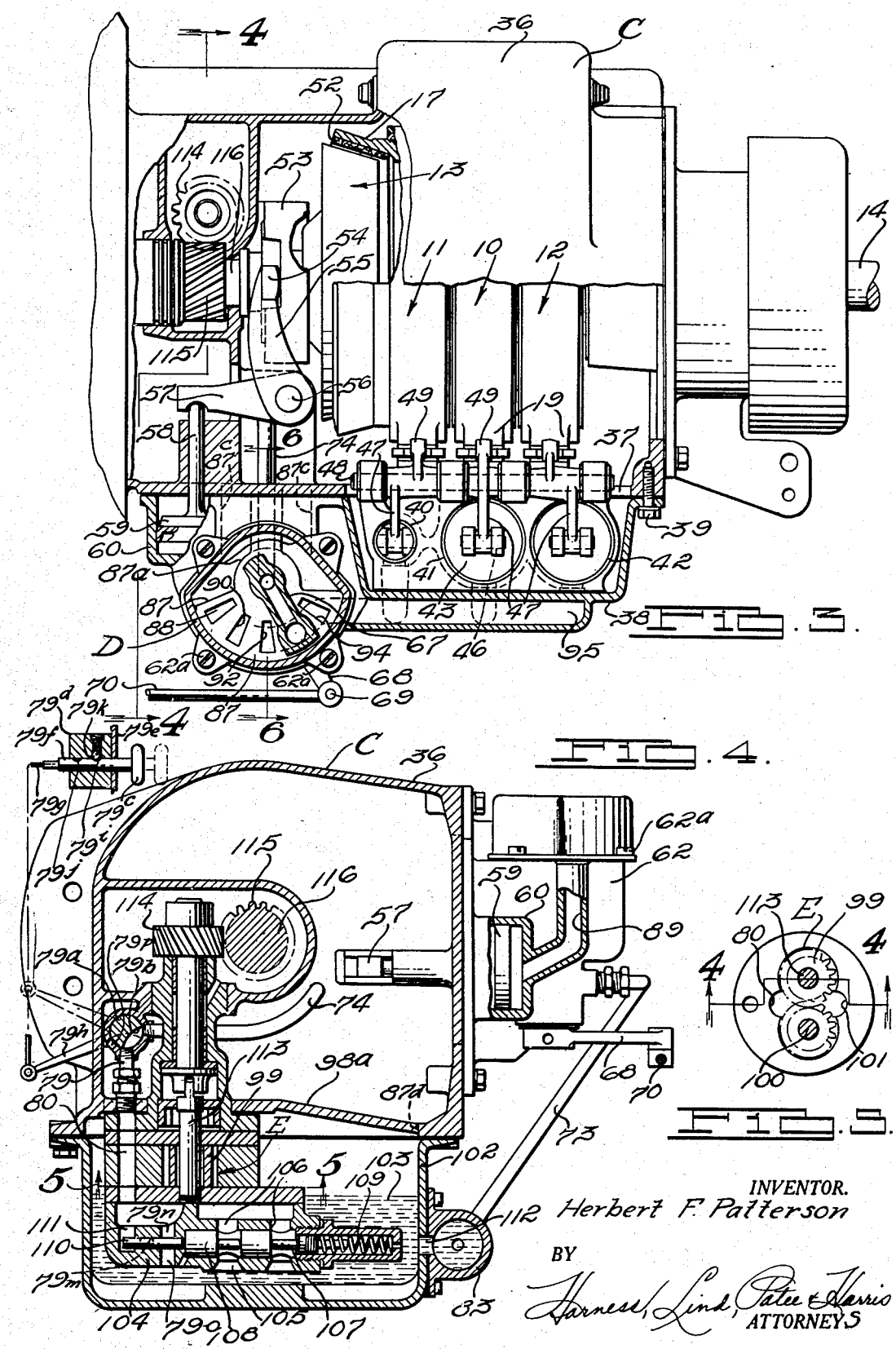

Jan. 18, 1938.    H. F. PATTERSON    2,105,755
POWER TRANSMISSION
Filed Jan. 25, 1934     4 Sheets-Sheet 3
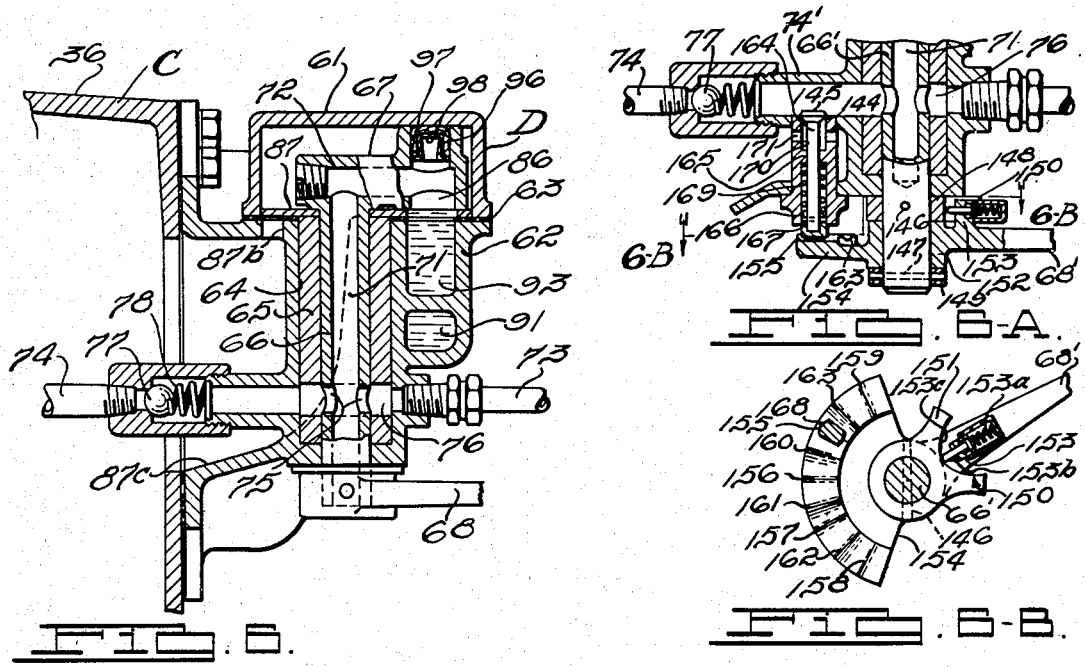
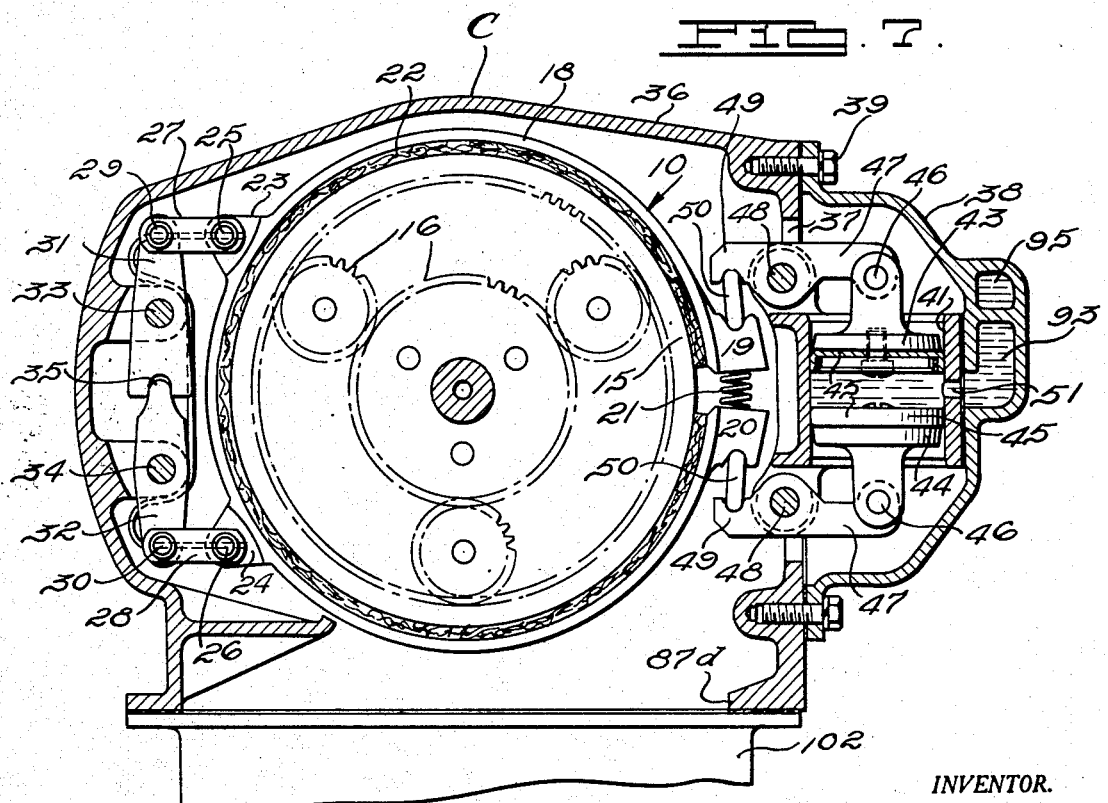
INVENTOR.
Herbert F. Patterson
BY
Harness, Lind, Pates & Harris
ATTORNEYS Jan. 18, 1938.  H. F. PATTERSON  2,105,755
POWER TRANSMISSION
Filed Jan. 25, 1934  4 Sheets-Sheet 4
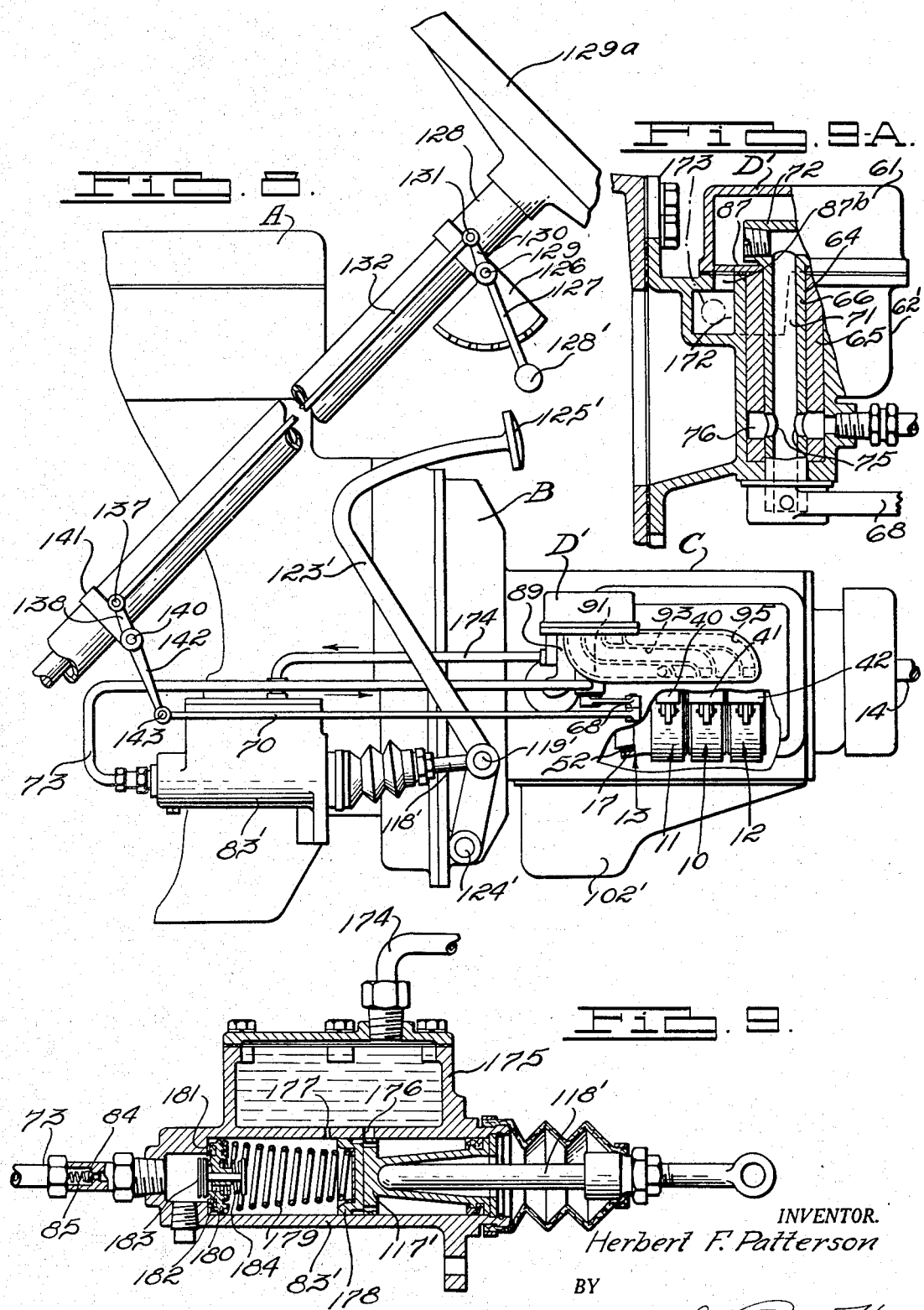
INVENTOR.
Herbert F. Patterson
BY
ATTORNEYS Patented Jan. 18, 1938

2,105,755

UNITED STATES PATENT OFFICE 2,105,755

POWER TRANSMISSION

Herbert F. Patterson, Detroit, Mich., assignor to Chrysler Corporation, Detroit, Mich., a corporation of Delaware Application January 25, 1934, Serial No. 708,235

35 Claims. (Cl. 74—262)

This invention relates to motor vehicles and refers more particularly to improvements in means for transmitting power to drive such vehicles.

More particularly, I have provided improvements especially adapted for varying the driving speed ratios of motor vehicles.

It is an object of my invention to provide improvements in motor vehicle transmissions and controls therefor; to provide improved means for operating the brake bands controlling the various gear trains of a planetary type of transmission; to provide relatively simple means for controlling or actuating a planetary transmission, capable of manufacture at relatively low cost.

A further object of my invention is to provide improved transmission controlling means, especially adapted for use with planetary transmissions, by transmission controls operating to establish the various gear ratios with improved positiveness, simplicity, and efficiency.

One feature of my invention, in its more limited aspects, resides in the provision of fluid operating means of improved form and arrangement for controlling the planetary gear sets of a transmission, or other corresponding parts of other types of transmissions. In the broader aspects of my invention, the fluid pressure may be air under pressure greater or less than atmospheric pressure or a suitable liquid.

In one illustrated embodiment of my invention a suitable fluid, preferably oil or the like, is supplied under pressure to the brake applying mechanisms of the planetary gear sets, means being provided to selectively supply the fluid under manual control. The oil pressure is normally derived from a suitable pump driven from a convenient part of the mechanism, an auxiliary or supplemental means being provided preferably in the form of a manually operated piston or the like whereby the transmission may be controlled independently of the normal system which includes the aforesaid power driven pump. This auxiliary transmission controlling means may thus be operated on failure of the normally operated system or in lieu thereof according to circumstances and desire on the part of the vehicle driver; the auxiliary controlling means preferably comprising a fluid operated system wherein the fluid, preferably the same liquid, forms the actuating medium between the manually operated pistons and the transmission actuating means.

In a further embodiment of my invention I have illustrated one manner of doing away with the power operated fluid pressure pump, the transmission being manipulated by a manually operated piston which preferably produces the fluid pressure for actuating the various transmission elements. The distribution or application of the fluid pressure is selectively regulated and obtained through the use of a distributing valve common to a plurality of the transmission controls. The fluid used in this system is preferably a liquid circulated separately from the transmission lubricating oil.

A still further object of my invention resides in the provision of an improved distributing valve especially adapted for use with transmissions of the aforesaid type, my valve being adapted to selectively supply a liquid under pressure to the various transmission controls in such a manner that entry of air to the liquid conduits is prevented. Difficulty has been experienced before in maintaining fluid systems employing liquids as the medium free from air, such air frequently entering the system and decreasing the efficiency and generally rendering the systems objectionable. I have also provided improvements in controlling and usefully distributing the forces of the fluid pressure acting on the distributing valve whereby an improved fluid seal is obtained and excess friction and wear is done away with.

Still further features of my invention reside in the provision of improved transmission controls employing fluid pressure cylinders of sizes or capacities varying with the forces required to properly operate the transmission controls, such as for the brake bands of the drums associated with the planetary gear sets, this feature providing, among other things, a reduction of weight and cost, a more compact arrangement of parts, and a more efficient distribution of the fluid pressure to the brake band controls.

A further object of my invention resides in the provision of means for relieving the fluid pressure when the operator manually selects a gear speed ratio, thereby relieving the operator of undue effort. This means in my illustrated embodiment comprises a relief valve for the fluid pressure conduit leading to the distributor valve, the valve being actuated during the first part of the manually operated selector arm whenever the latter is manually adjusted between its various positions of control.

Still another object of my invention resides in the provision of means for causing the fluid pressure to act on the distributor valve to seat the valve with any desired degree of pressure, the reaction being taken preferably on the distributor valve casing.

Further objects and advantages of my invention reside in the combination and arrangement of parts more particularly hereinafter described, reference being had for purposes of illustrating several embodiments of my invention to the accompanying drawings in which:

Fig. 1 is a side elevational view of my power transmission and associated controls;

Fig. 2 is an enlarged side elevational view of my transmission shown in Fig. 1, parts thereof being broken away to illustrate my novel fluid pressure controls;

Fig. 3 is a top plan view of my transmission, parts thereof being broken away to illustrate the fluid pressure distributing valve and transmission actuating mechanism;

Fig. 4 is a sectional elevational view taken along the line 4—4 of Fig. 3 and showing the fluid pressure pumping device in cross section, the pump cross section being taken along the line 4—4 of Fig. 5;

Fig. 5 is a detail view taken along the line 5—5 of Fig. 4 and illustrating the pumping gears and casing associated therewith;

Fig. 6 is a detail sectional elevational view along the line 6—6 of Fig. 3, the section being taken through the fluid pressure distributing valve;

Fig. 6A is a detail sectional elevational view of a modified arrangement of the distributing valve actuating mechanism shown in Fig. 6;

Fig. 6B is a sectional plan view along the line 6B—6B of Fig. 6A;

Fig. 7 is a transverse sectional elevational view through the transmission of Fig. 2, the section being taken along the line 7—7 of Fig. 2 and illustrating the controlling mechanism for one of the transmission gear trains;

Fig. 8 is a sectional elevational view corresponding to Fig. 1 but illustrating a modified form of my invention, a portion of the transmission casing being broken away to illustrate the gear speed ratio controls associated therewith;

Fig. 9 is a sectional elevational view of the manually operated fluid pressure producing means shown in Fig. 8; and Fig. 9A is an elevational view partly in section to show the return fluid conducting passages from the fluid distributor valve of the Fig. 8 modification.

Referring to the drawings I have illustrated my invention in connection with a motor vehicle drive, this drive including a prime mover or engine A, a portion of which is shown in Fig. 1, a clutch B driven from the engine, and a change speed transmission or gear box C.

I have illustrated the change speed transmission C as the epicyclic or planetary type, this general form of transmission being well-known in the art and, as usual, includes a plurality of controlling clutches or brakes 10, 11 and 12, these brakes being respectively adapted to actuate the transmission in its first speed ratio or low gear, second speed ratio, and reverse drive. A further controlling clutch or brake 13 is illustrated as a cone type, this clutch being adapted to control the transmission for effecting a direct drive through the transmission. The transmission has a power take-off shaft 14, which, where the transmission forms a part of a motor vehicle driving mechanism, may drive the usual well-known propeller shaft extending to the driving rear wheels (not shown) of the motor vehicle.

The controlling clutches 10, 11, and 12 are adapted to act on transmission elements associated therewith and usually embodied in the form of a rotary drum, one of which is illustrated at 15 in Fig. 7 in association with the transmission controlling clutch 10 for the first speed. It will be understood that the various transmission controlling clutches 10, 11, and 12 may be adapted in the well-known way for causing actuation of the respective epicyclic or planetary gear trains associated therewith, one of these gear trains being somewhat diagrammatically illustrated at 16 in Fig. 7. The form and arrangement of these planetary gear trains are well-known in the art and the details thereof are omitted from my disclosure. The clutch 13 is adapted to engage a drum portion 17 illustrated in Fig. 3 for effecting the direct drive in a manner well understood in the art.

The controlling clutches 10, 11, and 12 are, for the most part, similar in construction and operation and the following description of the details of clutch 10 illustrated in Fig. 7 is typical of the other clutches 11 and 12. In Fig. 7 the drum 15 is normally rotated by the planetary gearing 16 associated therewith when the transmission is not in its first gear ratio, and when rotation of drum 15 is prevented by the clutching or braking mechanism associated therewith, then the drive through the transmission takes place for the first gear ratio according to well-known practice for planetary gearings of the general type illustrated.

In order to brake the drum 15 I have provided a band 18 extending around the drum to provide ends 19 and 20 normally separated by spring 21, the band 18 being provided with a brake lining 22 adapted to contact with drum 15 when the ends 19 and 20 of the brake band are forced toward each other to contract the band. In order to anchor the band 18 and guide the same during its contracting movement so as to efficiently distribute the braking forces applied to drum 15 without substantial tendency toward axial displacement of the drum, I have provided a pair of circumferentially spaced anchors 23 and 24 extending outwardly from band 18, these anchors being respectively pivoted by pins 25 and 26 to links 27 and 28. These links are respectively pivoted at 29 and 30 to levers 31 and 32, the latter having fixed pivots 33 and 34 and having their inner ends interengaged at 35. This arrangement of levers and links tends to equalize the braking effort applied by band 18 to drum 15 as aforesaid.

The casing 36 of transmission C has an opening 37 at one side thereof to accommodate the actuating mechanism for the clutches 10, 11, and 12. This actuating mechanism is carried by a housing 38 secured by fasteners 39 to the casing 36, the housing 38 being provided with a plurality of cylinders 40, 41 and 42 respectively associated with the transmission controlling clutches 11, 10, and 12. Each cylinder, such as the cylinder 41 illustrated in Fig. 7, receives a pair of opposed pistons 43 and 44, these pistons being sealed against escape of fluid by a resilient cup 45 associated therewith. Each of the pistons 43 and 44 is pivotally connected at 46 to a lever 47, the latter being pivoted to a rod 48. The inner and relatively short lever portions 49 are adapted to actuate the aforesaid ends 19 and 20 of band 18 through the intermediate links 50, the arrangement being such that when fluid is introduced under pressure through the fluid inlet 51 of cylinder 41 the pistons 43 and 44 are forced apart so as to contract band 18 by reason of the connecting levers 47 and links 50. In Fig. 7 the band 18 is illustrated in its actuated and contracted position.

One feature of my invention resides in the provision of arranging the cylinders 40, 41, and 42 of varying sizes or capacities in accordance with the requirements for power to actuate the respective transmission controlling clutches associated therewith. Thus, the cylinder 40 associated with the second speed controlling clutch 11 is relatively small in size and capacity with reference to the cylinder 41 associated with the first speed controlling clutch 10, it being understood that greater torque is transmitted through the planetary gear set of the first speed than through the planetary gear set of the second speed and therefore a relatively greater braking effort is desirable in connection with the drum 15 of the first speed controlling clutch 10. In similar manner the cylinder 42 for actuating the reverse controlling clutch 12 is preferably relatively large in comparison with the cylinder 40.

The direct speed controlling clutch 13 is illustrated as a cone type clutch adapted to be actuated or shifted rearwardly as viewed in Fig. 3 for braking or clutching engagement with the friction band 52 carried by drum 17, the clutch 13 being actuated by a shift collar 53 engaged by a yoke 54 of a lever 55 pivoted at 56. This lever has an actuating lever arm 57 extending forwardly in engagement with a piston rod 58 connected to piston 59 operating in cylinder 60, the arrangement being such that when fluid under pressure is introduced to cylinder 60 the piston 59 will actuate lever 55 to engage clutch 13 with drum 17 and thereby establish the direct drive through transmission C.

I will next describe my fluid pressure distributing valve structure for selectively controlling the introduction of fluid under pressure to the cylinders 40, 41, 42, and 60 whereby the transmission C may be selectively placed in condition to effect the several driving speed ratios provided by the controlling clutches 11, 10, 12, and 13 respectively. The distributor valve casing structure is represented by the reference character D and is best shown in Figs. 3 and 6, comprising a casing or housing member 61 secured by fasteners 62a to the upper face of the casting 62, a suitable gasket 63 being interposed in order to maintain a fluid seal between these parts. The casting 62 is provided with a vertically extending bore 64 receiving a fixed bushing 65 and this bushing in turn rotatably receives the downwardly extending stem 66 of the distributing valve structure 67.

The stem 66 extends downwardly through casting 62 and is connected by an actuating lever 68 pivotally connected at 69 to a rod 70 which extends forwardly for manual manipulation by the selector mechanism which will be hereinafter more particularly described. The valve stem 66 has a central bore providing a fluid conducting passage 71 adapted to conduct the fluid under pressure upwardly of the stem to a communicating passage 72 of the valve member 67, the fluid being introduced to passage 71 either from a supply pipe 73 or from the pipe 74. The stem 66 has a plurality of openings 75 at all times communicating with a chamber 76 of bushing 65, this chamber 76 communicating with pipe 73 and also with pipe 74 through the ball check valve 77 seated by a spring 78. The pipe 74, as best shown in Fig. 4, extends to a fluid pressure inlet 79 which in turn communicates with the pressure delivery conduit or passage 80 of the fluid pressure pump E illustrated in Figs. 4 and 5 as a gear type of pump. In Fig. 4 the pump E and associated casing is shown in cross section, the section being taken approximately along the line 4—4 of Fig. 5. Further details of this pump and associated parts will be described in more particulars hereinafter.

The pipe 73, as best shown in Figs. 1 and 2, extends to an inlet 81 thereof, this inlet communicating by reason of a valve controlled outlet passage 82 with a fluid pressure producing cylinder 83 which will be referred to in more detail hereinafter. Intermediate the pipe inlet 81 and the cylinder outlet 82 is a ball valve 84 urged toward its seat by a spring 85 thereby forming a check valve between cylinder 83 and pipe 73.

Returning now to Fig. 6 it will be noted that the valve 67 has an outlet port 86 adapted to be selectively aligned with an arcuate series of ports formed in a plate 87 secured to the top of casting 62. Thus, the plate 87 is formed with a port 88 best shown in Fig. 3, this port at all times communicating with a conduit 89 best shown in Figs. 2 and 4 as communicating with the direct speed controlling cylinder 60. Likewise the port 90 communicates through a passage 91 with the second speed controlling cylinder 40; port 92 communicates through a passage 93 with the first speed controlling cylinder 41; and port 94 communicates through a passage 95 with the reverse controlling cylinder 42. In Fig. 3 it will be noted that the valve 67 is positioned intermediate ports 92 and 94, this being the neutral position of the valve. In this position the transmission C is in neutral, the power take-off shaft 14 being idle and the various controlling clutches 10, 11, 12, and 13 being inoperative or disengaged.

The plate 87 has one or more openings 87a therethrough, these openings being in continuous communication with passages 87b and 87c of casting 62, as best shown in Figs. 3 and 6, whereby surplus oil will drain from the upper face of plate 87 back to the oil sump or reservoir through opening 87d.

The valve 67 has a cylindrical opening 96 extending upwardly through the upper wall thereof, this opening being fitted with a leather cup 97, the cup opening downwardly so as to expand under the action of the fluid pressure in passage 72 and to thereby prevent escape of the liquid through opening 96. This cup 97 is provided with a spring seal retainer 98 adapted to prevent collapsing of cup 97 when the pressure is relieved within the cup. Without this opening 96 and associated cup 97, or the equivalent thereof, the resultant force from the oil pressure would act upwardly tending to unseat valve 67. The cross sectional area of passage 96 is preferably somewhat larger or greater than that of port 86 so as to provide a net downward pressure acting on valve 67 whereby this valve maintains a good fluid seal as it is moved across the plate 87 to successively register with the ports thereof. The reaction due to the fluid pressure acting on cup 97 is taken up by the cover 61 contacting with the cup.

As a further feature of my invention it will be noted that the passages 89, 91, 93, and 95 are at all times filled with the actuating fluid preferably all the way up to the level maintained at the upper face of the plate 87 at the respective ports 88, 90, 92, and 94. Thus, when the valve 67 is not in communication with any of these ports, air is prevented from entering the ports and associated passages since the valve delivery port 86 also has a quantity of the liquid maintained at its point of delivery which sweeps across the face of plate 87. It is important to prevent air from entering the fluid conducting system since such air would form a cushion and thereby prevent positive and efficient operation of the various control clutches of the transmission C.

I will next describe the normal and auxiliary pressure producing devices for the fluid, reference being made first to the gear pump E which is operated whenever the engine A is running to maintain the fluid under pressure at the valve delivery port 86, other conditions permitting this fluid pressure delivery as will be presently apparent. The pump E supported by bracket 98a, is illustrated as the gear type having pumping gears 99 and 100, these gears having a fluid inlet 101 adapted to draw fluid from the reservoir or sump 102 containing a body of the fluid, such as oil 103. Interposed in the line of suction to the pump is a valve casing 104 having fluid conducting passages 105 and 106, the supply of fluid from reservoir 102 to the pump inlet 101 being controlled by a rod 107 having valve portions 108, the rod being normally actuated by a spring 109 to position valve portions 108 as shown in Fig. 4 under which conditions the fluid is free to pass from the sump 102 to the pump inlet 101. The rod 107 has a portion or end 110 thereof projecting into a passage 111 which is in communication with the pressure delivery passage 88 of the pump so that when the fluid pressure exceeds a predetermined desired amount necessary to efficiently operate the controlling clutches of the transmission, the excess pressure developed by the pump will actuate the rod end 110 so as to move the valve portions 108 to the right as viewed in Fig. 4 against the influence of spring 107. In this manner the valve portions 108 are positioned to close off the passages 105 and 106 to cut off the supply of the fluid to the pump inlet 101. From Fig. 4 it will be observed that the fluid 103 in the sump 102 is in constant communication with cylinder 83 by reason of a passage 112, thereby maintaining cylinder 83 filled with the fluid from the sump. When rod 107 is moved to the right under excess pressure developed in chamber 111 to close the inlet passages 105, 106, then, where it is desired to relieve the excess pressure as well as to close off the pump inlet, the rod 107 may have a passage 79m communicating in said position of rod 107 with passages 79n and 79o.

In order to drive the pump E, one of the gears thereof such as the gear 99 has a driving shaft 113 fixed thereto, best shown in Fig. 4, this shaft being driven by a gear 114 carried at the upper end thereof and meshing with a driving gear 115 carried by the shaft 116 which extends forwardly to receive the drive from the engine A and clutch B. This pump drive is claimed in my co-pending application Ser. No. 708,234, filed January 25, 1934.

If desired suitable means may be provided to manually render the normal fluid pressure supply means including pump E ineffective, whereby the supplemental or auxiliary fluid pressure supply means including pedal 125 and cylinder 83 may be used even when the normal system is otherwise in operable condition. Thus, either of these systems may then be selectively operable under the control of the vehicle driver. As illustrative of such provision, referring particularly to Figs. 1 and 4, the outlet pipe 79 may be provided with a valve 79a having a passage 79b normally establishing communication between conduits 79 and 74. A handle 79c is slidable in a guide 79d carried by the vehicle dash 79e, the handle stem 79f actuating the valve 79a through Bowden wire 79g and lever 79h, the latter rotating valve 79a. Stem 79f has notches 79i and 79j, the former being normally engaged by the spring pressed ball 79k. When knob 79c is pulled by the operator from dash 79e to the dotted position shown in Fig. 4, ball 79k engages notch 79j and valve 79a is rotated to close off conduits 79 and 74, the pump E being rendered ineffective as to pressure delivery of fluid to the pipe 74. When this occurs the valve passage 79b places the pump delivery conduit 79 in communication with a port 79p for directing the oil pump delivery back to the reservoir 102, thereby relieving the pump and its driving mechanism of the work required for pumping oil under pressure.

Referring now to Figs. 1 and 2, the cylinder 83 is provided with a reciprocating piston 117 adapted for actuation by a rod 118 extending forwardly for pivotal connection at 119 with a link 120. As best shown in Fig. 1 the link 120 is pivotally connected at 121 to the downwardly extending arm 122 of the actuating lever 123, this lever being pivotally mounted at 124 and being provided with a pedal 125 adapted to be actuated by the foot of the vehicle operator, it being understood that this pedal extends to a suitable point for convenient manipulation by the vehicle driver.

I will next describe my manually operated device for actuating the distributing valve 67 for selectively causing operation of the transmission controlling clutches 10, 11, 12, and 13. Referring to Fig. 1, I have provided a selector segment 126 mounted at a convenient point for manipulation by the vehicle driver, the illustration showing this segment mounted by a bracket 127 to the steering post 128 provided with the usual vehicle steering wheel 129a. Movably associated with segment 126 is a manually operated selector arm 127 having a handle 128' adapted to be shifted by the hand of the vehicle driver, the arm 127 being pivotally supported at 129 and being further provided with a lever portion 130 connected by a pivot 131 to a link 132. The segment 126 has an arcuate series of spaced notches adapted to receive the arm 127 and to thereby advise the operator of the proper desired positioning of the selector controlling mechanism. In Fig. 1 the handle 128' is illustrated in the neutral position corresponding to the neutral position of the distributing valve 67 as shown in Fig. 3. Segment 126 has a notch 133 and when the selector arm 127 is engaged in notch 133, the valve 67 is positioned to register the delivery port 86 thereof with the port 94 for supplying fluid under pressure to the cylinder 42 which controls the actuation of the reverse controlling clutch 12 of transmission C. In similar fashion segment 126 has a notch 134 for receiving arm 127 to register ports 86 and 92 for actuating the first speed controlling clutch 10 of the transmission. The segment 126 has a further notch 135 arranged so that when arm 127 is engaged therewith, the valve 67 will register the valve port 86 with the port 90 and thereby cause actuation of the transmission controlling clutch 11 for the second speed gear ratio. In similar manner the notch 136 is adapted to receive the selector arm 127 to further swing the valve 67 to register ports 86 and 88 for controlling the actuation of the direct speed controlling clutch 13 of the transmission. The movement of the arm 127 is transmitted to the valve 67 through the aforesaid links 132 which extends downwardly along the steering post 128 for pivotal connection at 137 to the arm 138 of the lever 139, this lever being pivotally supported at 140 to a bracket 141 carried by the steering post 128. The lever 139 has a second lever arm 142 pivotally connected at 143 with the aforesaid rod 70 which, as aforesaid, extends rearwardly for connection to the actuating arm 68.

In operation of the driving mechanism as thus far described, the engine A transmits its drive through the clutch B, this drive passing through the driving shaft 116 to drive the transmission C, the drive therefrom being taken by shaft 14 as aforesaid. Where the transmission C is a planetary type as illustrated, I prefer to provide a clutch B of the well-known fluid coupling type since a fluid coupling or clutch has advantages of smoothness of drive where this type of clutch is used in combination with a planetary type of transmission. However, other suitable or well-known types of clutches may be used intermediate the engine and transmission as may be desired in any particular installation.

For purposes of illustration let it be assumed that the motor vehicle is standing still with the selector arm 127 in its neutral position as shown in Fig. 1. In such position the distributor valve 67 is not in communication with any of the distributing ports of the plate 87, this being the position of the valve as illustrated in Fig. 3. Under such circumstances there is no drive being transmitted through transmission C although the pump E is being actuated by the shaft 116 to pump fluid under pressure from the reservoir 102 to the valve passage 72. The oil circulated by pump E, in this embodiment of my invention, is preferably the same oil which is used for lubricating the transmission parts. When the vehicle driver desires to drive the car from the aforesaid neutral position, he grasps the handle 128' and moves the selector arm 127 so that it engages the first speed notch 134 thereby moving the valve 67 so that the outlet port 86 thereof is placed in registration with the first speed port 92 of the plate 87. In such position the oil under pressure from pump E is admitted to the first speed actuating cylinder 41 causing the first speed controlling clutch 10 to be actuated and thereby drive the shaft 14 in the low speed gear ratio. This actuation of the controlling clutch 10 is brought about by reason of the outward displacement of the first speed pistons 43 and 44 as shown in Fig. 7, this displacement producing a contraction of the brake band 18 so as to hold the first speed drum 15 stationary.

When the operator desires to drive the vehicle in the second gear ratio provided by transmission C, he next moves the selector arm 127 from the aforesaid engagement with notch 134 to register same with the second speed notch 135 thereby causing the valve 67 to move from port 92 to the port 90. When the valve 67 is thus moved, the oil pressure is relieved in the first speed oil conduit 93 and cylinder 41 so that the spring 21 associated with the first speed band 18 will act to expand the band and restore the first speed pistons 43 and 44 to their normal contracted positions thereby releasing the first speed gear ratio. When the first speed pistons 43 and 44 move toward each other during the said expansion of band 18, the oil displaced thereby spills over at the port 92, this oil running over plate 87 to the passages 87ª, 87ᵇ, and 87ᶜ so as to return to the reservoir 102. However, it will be noted that the oil level is maintained in the upper surface of the plate 87 so as to prevent the entrance of air to the fluid conducting passages between the plate 87 and the various cylinders associated with the transmission controlling clutches.

When the valve 67 is aligned with the second speed port 90 as aforesaid, the oil pressure supplied through the valve 67 acts through the second speed oil conducting passage 91 leading to the second speed cylinder 40, the second speed controlling clutch 11 being thereby actuated in the same manner as that just referred to in connection with the first speed controlling clutch 10.

After the car has been accelerated in the aforesaid second speed, or under such other circumstances as the vehicle driver may elect, the operator may then move the selector arm 127 to disengage the same with the second speed notch 135 and to engage this arm with the direct speed notch 136. During such movement it will be apparent that the second speed controlling clutch 11 is released in the same manner as that just previously described in connection with other of the controlling clutches, the oil pressure being then supplied to the port 88 and the direct speed oil conducting passage 89 leading to the direct speed cylinder 60 whereby to effect the engagement of the first speed controlling clutch 13 so as to drive the shaft 14 and the vehicle driven thereby in the direct speed.

While I have described in the foregoing assumed illustration, a progressive or step by step movement of valve 67 so as to successively register the valve port 86 with the ports 92, 90, and 88, it will be apparent that the valve 67 may be operated by the selector arm 127 to supply the oil under pressure to any of the ports of plate 87 from a previous engagement of valve port 86 with any of these parts. In other words and by way of further illustration, the operator may move the valve 67 from the neutral position shown in Fig. 3 directly to the second speed port 90 or the third or direct speed port 88 without pausing at the successive ports of the plate 87.

When the operator desires to drive the vehicle in reverse, he operates the selector arm 127 so as to cause this arm to register with the reversing notch 133, the valve 67 being thereby shifted so as to align the outlet port 86 with the port 94 of plate 87, the oil pressure being thereby conducted through the reversing oil passage 95 to the reverse cylinder 42 for energizing or operating the reverse controlling clutch 12 of the transmission.

In connection with the foregoing description of the operation of my driving mechanism, the controlling clutches 10, 11, 12, and 13 of the transmission C have been described as being operated by oil pressure derived by the pump E as a port of the normal operating mechanism. I have further provided additional means, preferably under manual control by actuation of the pedal 125 by way of example, whereby the controlling clutches of the transmission may be actuated independently of the fluid pressure system derived by the pump E. This auxiliary or supplemental system is of particular advantage in the event of failure of the pump E or other parts of the aforesaid normal oil pressure system inasmuch as the vehicle operator may readily drive the vehicle and operate the various transmission controlling clutches independently of the normal system. Furthermore, if desired, the operator may control the transmission by reason of the auxiliary system even when the normal system including the pump E is in operative condition by actuating handle 79c to close valve 79a. Further, if desired, the normal system may be dispensed with and the transmission controlling clutches may, in such instance, be responsive entirely to operation through a suitable actuating member such as the aforesaid manually operated pedal 125.

When it is desired to control the transmission under the influence of the pedal 125, the operator pulls the handle 79c to actuate valve 79a to render pump E ineffective, assuming that the normal system is otherwise in operative condition. The operator then manually controls the selection of the desired gear ratio of the transmission by the aforesaid selector arm 127 and in the same manner as that previously described. However, instead of the various transmission controlling clutches being immediately responsive in their actuation to a shifting movement of the valve 67, these controlling clutches are not actuated in response to shifting of the valve 67 until the fluid conducted through the valve is placed under pressure by actuation of pedal 125. Thus, when valve 67 is moved from a neutral position to align the port 86 thereof with the first speed port 92, the transmission controlling clutch 10 is not actuated until such time as the operator may depress the pedal 125 to move the piston 117 to the right as viewed in Fig. 2, thereby producing a fluid pressure in the conduit 73 leading to the valve passages 71 and 72. On release of the pedal 125 the pressure is maintained so as to effect a continued engagement of the first speed controlling clutch 10 by reason of the check valve 84 and the controlling clutch 10 will continue to be actuated until the operator moves the selector arm 127 to a further position. When the selector arm is thus moved, the valve 67 is positioned out of registration or communication with the first speed port 92 and this port is thereby open to the oil reservoir 102 by reason of the passage 87a in the same manner as previously referred to in connection with the description of the normal actuating mechanism for the controlling clutches. Inasmuch as cylinder 83 of the foot operated piston 117 is continuously in communication with the reservoir 102, it will be apparent that this cylinder is continuously supplied with oil from the reservoir. When piston 117 is actuated by pedal 125, the first part of the piston movement closes off communication of the reservoir 102 with cylinder 83 so that further movement of piston 117 produces the desired oil pressure in the conduit or pipe 73. In the same manner as has been previously referred to, the operator may actuate the selector arm 127 so as to engage any of the notches of the segment 126, thereby positioning the valve 67 to register the port 86 with the corresponding ports of the plate 87, the associated controlling clutch of the transmission being actuated whenever the operator depresses the pedal 125.

In the event that both of the pistons for actuating the transmission controlling clutches are embodied together in a motor vehicle, it will be apparent that these pistons may be alternatively used as illustrated in my drawings. Thus, when the oil pressure system including the pump E is being used, the oil is supplied under pressure to valve 67 by reason of the check valve 77 which is unseated to accommodate the passage of the oil to the valve. At the same time the check valve 84 associated with the cylinder 83 remains seated so as to prevent the escape of the oil pressure from pipe 74 through the pipe 73. In a similar manner, whenever the transmission controlling clutches are being operated in response to manual operation of the foot pedal 125, the check valve 77 remains seated (assuming either that pump E is inoperative or that valve 79a is closed so as to by-pass the oil through opening 79b back to the reservoir) so as to prevent the escape of the oil pressure from cylinder 83 and pipe 73 as the oil is conducted therefrom to the valve 67.

During the operation of valve 67 in response to movement of the selector arm 127, the valve is urged toward the plate 87 so as to maintain the desired fluid seal at the outlet port 86 by reason of the cup 97.

Referring now to Figs. 6A and 6B I have illustrated as a modification of my invention, a means whereby the pressure of the oil in the valve passages 71 and 72 is relieved whenever the operator manually shifts the selector arm 127. This means is particularly desirable in relieving the operator of such effort as may be occasioned by the oil pressure resisting movement of valve 67 whereby selector arm 127 may be readily and easily moved from one of its aforesaid positions to any other position.

In Fig. 6A I have illustrated only a portion of the corresponding distributor valve illustrated in Fig. 6, it being understood that the upper part of the distributor valve illustrated in Fig. 6A may be identical with that disclosed and described in connection with Fig. 6 and likewise the distributor valve of Fig. 6A is intended to be substituted for the corresponding parts of Fig. 6, the operation being identical to that previously described with the exception of the oil pressure release as will be more apparent from the following description. In Fig. 6A the valve stem 66' corresponds to the valve stem 66 of Fig. 6, this valve stem 66' having the same fluid conducting passage 71 as previously referred to, the oil pressure being conducted to the passage 71 selectively from the pipes 74 or 73 as aforesaid but in the case of Fig. 6A, the pipe 74 communicates by way of the aforesaid check valve 77 with a conduit or passage 74' having a port 144 extending downwardly through the wall thereof, this port being controlled by a valve 145, the purpose of which will be presently apparent.

Secured to the valve stem 66' by reason of the pins 146 and 147 are a pair of collars 148 and 149, the collar 148 having a pair of laterally extending arcuately spaced projections 150 and 151 having inner inclined faces 153c, best seen in Fig. 6B. Surrounding the valve stem 66' intermediate the collars 148 and 149 is a hub 152, this hub being freely rotatable with respect to the stem 66' and being provided with an arm 68' which corresponds to the arm 68 of Fig. 6 and which likewise is adapted for movement in response to manual adjustment of the selector arm 127. The arm 68' carries a finger 153 which extends upwardly between the projections 150 and 151, the finger 153 having a certain amount of free movement between these projections. The finger 153 carries a detent 153b urged toward faces 153c by a spring 153a.

Carried by the hub 152 and extending laterally therefrom in the direction opposite to the arm 68' is a cam segment 154. This cam segment is provided with a series of arcuately spaced depressions 155, 156, 157, 158, and 159, adjacent depressions being separated by upwardly extending cams 160, 161, 162, and 163. The depressions or faces between the cams correspond to the notches which are provided in the selector segment 126 and also corresponding to the positions of the distributor valve 67 so that when this valve is in the neutral position, the valve stem 66' and arm 68' will be positioned as illustrated in Fig. 6B. Thus, the depression 155 may be called the neutral depression and in similar manner the depressions 156 to 159 inclusive may be respectively termed the depressions corresponding to the first speed, the second speed, the third speed, and the reverse speed.

The valve 145 is provided with a downwardly extending valve stem 164 operating in a guide 165, this valve stem being provided at the lower end thereof with a cam follower 166 secured by a pin 167 to the valve stem. The cam follower 166 has a lower end 168 which is relatively narrow as shown in Fig. 6B, this end extending downwardly between adjacent cams 160 and 163 in the position illustrated in Figs. 6A and 6B, the end of the cam follower 168 being preferably slightly spaced from the bottom of the space 155 between these adjacent cams whereby the valve 145 will be at all times securely seated at 144 when the follower 168 is positioned intermediate any two adjacent cams. In order to normally urge the cam follower 168 downwardly and also to assist in the seating of valve 145, I have provided a spring 169 which acts between the guide 165 and the cam follower 166. The valve 145 is relatively small so as to be only lightly loaded by the fluid pressure in passage 74'.

In the operation of the mechanism just described, referring to Figs. 6A and 6B, and assuming that the valve stem 66' is positioned as illustrated for placing the cam follower 168 in the neutral space 155, let it be assumed that the operator desires to actuate the distributor valve for engaging the first speed controlling clutch 10 of the transmission. Thus, the operator will actuate the selector arm 127 of Fig. 1 to engage this arm with the first speed notch 134, this movement actuating the arm 68' in a clockwise direction as viewed in Fig. 6B. The first part of the movement of arm 68' will bring the cam 160 into engagement with the cam follower 168 before the finger 153 engages the projection 151 whereby the cam follower 168 will be forced upwardly against the tension of spring 169 to unseat the valve 145 and thereby relieve the oil pressure in the valve stem 71 prior to the time that the arm 68' actuates the valve stem 66'. After the arm 68' has been actuated so as to relieve the oil pressure as aforesaid, the latter part of the movement of arm 68' will cause engagement of the finger 153 with the projection 151 so as to pick up the collar 148 and the valve stem 66' in order to move the valve 67 from the neutral position shown in Fig. 3 toward a position tending to register the outlet port 86 thereof with the first speed port 92 for supplying the fluid under pressure to the first speed cylinder 41. During this movement of valve 67 the cam follower 168 will pass over the cam 160 and register with the space 156, the valve 145 at the same time seating so as to restore the oil pressure in the valve stem passage 71. As the cam follower 168 is depressed by spring 169, assisted by the fluid pressure acting on valve 145 where pump E is operating, the cam follower acts on the inclined side of cam 160 to slightly rotate the cam segment 154. After arm 68' is brought to rest the spring 153ᵃ acting on detent 153ᵇ will continue the motion of collar 148 and valve 67 connected thereto to again slightly space projections 150 and 151 from the finger 153. Thus, while spring 153ᵃ is not strong enough to move the stem 66' during the initial movement of arm 68' when valve 145 is seated, this spring 153ᵃ has sufficient strength to cause detent 153ᵇ to act on the inclined faces 153ᶜ of projections 150, 151 so as to continue the movement of the stem 66' during the final seating action of valve 145. When the valve 145 is unseated, the passages 74' and 71 are vented through the valve port or seat 144 by reason of the annular passage 170 surrounding the valve stem 164 and the openings 171 in the guide 165, the openings 171 draining the oil back to the reservoir 102 by reason of the aforesaid passage 87ᶜ in the casting 62'. In a similar manner it will be apparent that when arm 68' is moved in either of its rotational directions to effect an adjustment of the valve 67, the initial part of such movement will vent the passages 74' and 71 so as to relieve the oil pressure acting on the valve 67 and thereby facilitate easy adjustment of the distributor valve under the influence of the selector arm 127.

The pressure release mechanism of Figs. 6A and 6B is thus of advantage in connection with either the normal system including the fluid pressure pump E or in connection with the auxiliary system including the pedal operated piston 117. When either of these pistons is employed to actuate the controlling clutches of the transmission, it will be apparent that the oil pressure in the valve stem 71 is relieved when the operator actuates the selector arm 127 to effect a movement of the valve 67.

Referring now to the slightly modified form of my invention illustrated in Figs. 8, 9, and 9A, the majority of the parts and the operation thereof are similar to the embodiments of my invention hereinbefore described in detail and in order to avoid repetition, these parts and the operation thereof will not be referred to. Wherever these parts are the same or similar in general construction and operation, it will be noted that I have employed the same reference characters to designate such parts.

The fluid pressure producing cylinder 83' is provided with a reciprocating piston 117' adapted to be actuated by the rod 118' pivotally connected at 119' to the actuating lever 123', the latter being formed with the foot pedal portion 125'. The lever 123' is pivotally mounted at 124'. The cylinder 83' has an outlet pipe 73 which, as in the case of the Fig. 1 embodiment, is adapted to supply fluid under pressure controlled by the same check valve 84 and spring 85, the fluid being conducted to the distributor valve D' which is similar to the aforesaid distributor valve D of Fig. 6 except that the supply pipe 74 of Fig. 6 has been omitted. A further difference in connection with the distributor valve D' as shown in Fig. 9A resides in the manner in which the fluid is returned. Thus, in Fig. 9A the excess fluid flows over the aforesaid plate 87 and through the aforesaid opening 87ᵇ but from this opening the fluid is received in a chamber 172 formed as a part of the casting 62', this fluid being then returned through an outlet 173 and return pipe 174 shown in Fig. 8 to the fluid reservoir 175, this reservoir being in communication with cylinder 83' through the passages 176 and 177. In this modified form of my invention the fluid employed is preferably kept separate from the oil which is used for lubrication of the transmission and this is possible inasmuch as the system is what may be termed a closed system wherein the liquid is circulated under pressure from the cylinder 83' to the distributor valve D' and then back again to the reservoir 175. The fluid stored in the reservoir 175 may be of any suitable composition and by way of example this fluid may be the brake fluid commercially used at the present time in connection with hydraulic wheel braking systems employed for motor vehicles.

Piston 117' has a flexible cup 178 receiving a spring 179 which extends forwardly of the cylinder to seat a valve carrying member 180 against the outlet 181. The valve carrier 180 is formed with one or more openings 182 for subjecting the fluid in the cylinder 83' to a check valve 183 having a spring 184 associated therewith to normally seat this valve on the valve carrier 180. The arrangement is such that when the piston 117' is moved to the left as viewed in Fig. 9 under the influence of the pedal 125', the piston closes off communication between reservoir 175 and cylinder 83', the pressure developed by the piston in the cylinder acting to unseat the check valve 183 and thereby supply the fluid under pressure through the aforesaid check valve 84 and thence to the distributor valve passage 71 for actuating any of the transmission controlling clutches which may have been previously determined by the setting of the valve 67 from the selector arm 127.

When the pedal 125' is released, the check valve 84 will serve to maintain the fluid pressure at the valve 67 so as to maintain the aforesaid transmission controlling clutch in engagement, the piston 117' returning to its normal position illustrated in Fig. 9. During this return movement the check valve 183 will be seated by the spring 184, it being understood that when the piston 117' first starts its aforesaid return movement the valve 183 may initially unseat until the pressure of the fluid is substantially balanced to either side of this valve. In the event that the cylinder 83' is not filled at any time with the fluid, it is apparent that this fluid will readily flow from the reservoir 175 to the cylinder through the passage 177 and also the passage 176, the flexible cup 178 being adapted to peripherally deflect on the return movement of the piston to accommodate passage of the fluid forwardly past the cup.

The operation of the system corresponds to that described hereinbefore in connection with the pedal 125 and the selector arm 127 of the Fig. 1 embodiment of my invention. It is therefore believed to be unnecessary to further repeat the operation of this further embodiment of my invention.

It will be noted that the cylinder 83' of Fig. 8 may be located at any convenient point and that this cylinder is not supplied with the oil from the reservoir or sump 100' of transmission C.

While I have illustrated my power transmission mechanism in connection with a transmission of the planetary type, I desire to point out that I do not limit my invention in its broader aspects to this particular type of transmission since other forms of transmissions may be employed with the fundamental principles of my inventions if desired. Likewise various changes and modifications may be made throughout my power transmissions and within the scope of the appended claims, and it is not my intention to limit my inventions to the particular combinations and arrangement of parts shown and described herein for illustrative purposes.

What I claim is:

1. In a power transmission, a plurality of speed ratio controlling devices, manually controlled selector means including a common selector element for said controlling devices, power operating means for actuating said controlling devices selectively in response to actuation of said selector means, and manually operating power applying means for selectively actuating said controlling devices independently of the first said power operating means.

2. In a power transmission, a plurality of fluid actuated speed ratio controlling devices, means including a pump for supplying fluid under pressure to said controlling devices, and manually operated fluid pumping means for supplying fluid under pressure to said controlling devices independently of said pumping means.

3. In a power transmission, a plurality of fluid actuated speed ratio controlling devices, power operated fluid pumping means, means including a distributor valve for supplying said fluid from said power operated pumping means selectively to said controlling devices, and manually operated fluid pumping means for supplying fluid under pressure to said distributor valve independently of said power operated pumping means.

4. In a power transmission, a plurality of fluid actuated speed ratio controlling devices, means including a pump for supplying fluid under pressure to said controlling devices, manually operated fluid pumping means for supplying fluid under pressure to said controlling devices independently of said pumping means, and fluid distributing means for distributing said fluid for selective supply to said controlling devices.

5. In a power transmission, a plurality of fluid actuated speed ratio controlling devices, means including a pump for supplying fluid under pressure to said controlling devices, manually operated fluid pumping means for supplying fluid under pressure to said controlling devices independently of said pumping means, and a distributor valve for placing either said pump or said pumping means selectively in communication with said controlling devices.

6. In a power transmission, a plurality of fluid actuated speed ratio controlling devices, conduits for respectively conducting fluid under pressure to said controlling devices, fluid distributing means for said conduits, manually operated means for actuating said fluid distributing means, and a plurality of selectively operable fluid pumping means for supplying fluid under pressure to said fluid distributing means.

7. In a power transmission, a plurality of fluid actuated speed ratio controlling devices, conduits for respectively conducting fluid under pressure to said controlling devices, fluid distributing means for said conduits, manually operated means for actuating said fluid distributing means, a power actuated pump for supplying fluid under pressure to said fluid distributing means, and manually operable pumping means for supplying fluid under pressure to said fluid distributing means independently of said power actuated pump.

8. In a motor vehicle power transmission, a plurality of forwardly driving speed ratio controlling devices, cylinders respectively associated with said controlling devices, means including a piston associated with each of said cylinders for actuating said controlling devices to provide different speed ratio drives through the transmission, and means for selectively supplying fluid under pressure separately to said cylinders, said cylinders having relatively different cross sectional areas providing relatively different fluid pressure force transmitting capacities for their respective pistons.

9. In a power transmission, a plurality of fluid actuated speed ratio controlling devices, a distributor valve chamber structure having a plurality of fluid conducting ports adapted to supply fluid to said controlling devices respectively, a valve structure within said chamber structure having an outlet port, means for moving said valve to place the port thereof selectively in communication with said fluid conducting ports, means for supplying fluid under pressure to said valve structure, and means associated with said valve structure for utilizing the fluid pressure in said valve structure to oppose the tendency of the fluid pressure to relatively displace said structures.

10. In a power transmission, a plurality of fluid actuated speed ratio controlling devices, a distributor valve chamber structure having a plurality of fluid conducting ports adapted to supply fluid to said controlling devices respectively, a valve structure within said chamber structure having an outlet port, means for moving said valve to place the port thereof selectively in communication with said fluid conducting ports, means for supplying fluid under pressure to said valve structure, said valve structure having an opening, and a piston within said opening, said piston being exposed to the fluid pressure within said valve structure and transmitting the force thereof to said chamber structure.

11. In a power transmission, a plurality of fluid actuated speed ratio controlling devices, a distributor valve chamber structure having a plurality of fluid conducting ports adapted to supply fluid to said controlling devices respectively, a valve structure within said chamber structure having an outlet port, means for moving said valve to place the port thereof selectively in communication with said fluid conducting ports, means for supplying fluid under pressure to said valve structure, and means for relieving the pressure of the fluid in said valve structure in response to movement thereof.

12. In a power transmission of the planetary gear type having a plurality of rotary elements and associated controlling devices adapted to brake the rotary elements, fluid operated pistons respectively associated with and adapted to actuate said controlling devices, a cylinder for each of said pistons, a distributor valve formed with a fluid conducting stem and having a fluid conducting arm formed with an outlet port, conduits respectively communicating at one end thereof with said cylinders and terminating in fluid receiving ports at their other ends, means including a selector element adapted for manual movement for rotating said stem and valve for selectively registering said valve outlet port with the fluid receiving ports of said conduits, fluid pressure producing means adapted to supply fluid under pressure to said valve stem, means for returning each of said pistons to its non-operating position in response to movement of said distributor valve to shift the outlet port thereof away from a previous position of communication with the said conduit respectively communicating with the last said piston, and means for collecting the fluid displaced by said piston returning means and returning said fluid to said fluid pressure producing means.

13. In a power transmission of the planetary gear type having a plurality of rotary elements and associated controlling devices adapted to brake the rotary elements, manually controlled selector means for said controlling devices, and a plurality of force producing means adapted for operation independently of each other to actuate said controlling devices.

14. In a power transmission, a fluid pressure actuated speed ratio controlling device, a cylinder, a piston in said cylinder, means for actuating said controlling device in response to displacement of said piston from an inoperative position to an operative position, means for returning said piston to said inoperative position, a plate-like member having a fluid receiving port positioned at an elevation at least as great as that of said cylinder, a fluid conducting conduit intermediate said port and said cylinder, a fluid conducting valve having an outlet portion formed with a port, said valve movably contacting with said plate-like member, means for supplying fluid under pressure to said valve, the fluid in said conduit maintaining a level at the port of said plate-like member when said piston is in its said inoperative position whereby entry of air into said conduit is substantially prevented.

15. In a power transmission, a plurality of speed ratio controlling devices, manually controlled selector means including a common fluid distributor valve for supplying fluid under pressure selectively to said controlling devices, fluid power operating means for supplying fluid under pressure to said distributer valve for actuating said controlling devices selectively in response to actuation of said selector means, and manually operating means for effecting selective operation of said controlling devices independently of said fluid power operating means.

16. In a transmission of the planetary gear type having a plurality of planetary gear operated rotary elements and associated brakes for selectively braking said elements to provide a plurality of speed ratio drives through said transmission, fluid power operated means for actuating said brakes to arrest rotation of said rotary elements respectively associated therewith, and additional fluid power operated means for actuating at least one of said brakes to provide a drive through said transmission independently of the first said fluid power operating means.

17. In a transmission of the planetary gear type having a planetary gear operated rotary elements and associated brakes for selectively braking said elements to provide a plurality of speed ratio drives through said transmission, fluid power operated means for actuating said brakes to arrest rotation of said rotary elements respectively associated therewith, additional fluid power operated means for actuating at least one of said brakes to provide a drive through said transmission independently of the first said fluid power operating means, and a common brake operating element operably connected to one of said brakes and adapted for operation by both of said fluid power operated means.

18. In a transmission of the planetary gear type having a plurality of planetary gear operated rotary elements and associated brakes for selectively braking said elements to provide a plurality of speed ratio drives through said transmission, fluid power operated means for actuating said brakes to arrest rotation of said rotary elements respectively associated therewith, and additional fluid power operated means for actuating at least one of said brakes to provide a drive through said transmission independently of the first said fluid power operating means, at least one of said fluid power operated means including a fluid pumping device.

19. In a planetary transmission having a planetary gear operated rotary drum and associated movable shoe adapted when moved to arrest rotation of said drum, means including an element operably connected to said shoe for moving said shoe, and a plurality of independently operable fluid pressure applying means adapted to actuate said shoe moving means through the intermediary of said element.

20. In a planetary transmission having a planetary gear operated rotary drum and associated movable shoe adapted when moved to arrest rotation of said drum, means including a piston operably connected to said shoe for moving said shoe, and a plurality of independently operable fluid pressure applying means adapted to actuate said shoe moving means through the intermediary of said piston.

21. In a power transmission of the planetary gear type having a plurality of planetary gear operated rotary elements and associated brakes for selectively braking said elements to provide a plurality of speed ratio drives through said transmission, a fluid pressure operated device for actuating each of said brakes, a rotary distributing valve adapted to selectively supply fluid under pressure to said brake actuating devices, a fluid reservoir, means for supplying fluid under pressure from said reservoir to said rotary distributing valve, means for returning said fluid from said brake actuating devices to said reservoir, and manually operated means for rotatably adjusting said distributing valve, said brake actuating devices being operated in direct response to said manual adjustment of said distributing valve.

22. In a power transmission of the planetary gear type having a plurality of planetary gear operated rotary elements and associated brakes for selectively braking said elements to provide a plurality of speed ratio drives through said transmission, a fluid pressure operated device for actuating each of said brakes, a rotary distributing valve adapted to selectively supply fluid under pressure to said brake actuating devices, a fluid reservoir, means for supplying fluid under pressure from said reservoir to said rotary distributing valve, means for returning said fluid from said brake actuating devices to said distributing valve and thence to said reservoir, and manually operated means for rotatably adjusting said distributing valve, said brake actuating devices being operated in direct response to said manual adjustment of said distributing valve.

23. In a power transmission, a plurality of speed ratio controlling devices, a fluid pressure operated device for actuating each of said controlling devices, a rotary distributing valve adapted to selectively supply fluid under pressure to said fluid pressure operated devices, a fluid reservoir, means for supplying fluid under pressure from said reservoir to said rotary distributing valve, means responsive to operation of said distributing valve for establishing communication between said reservoir and each of said fluid pressure operated devices except such fluid pressure operated device which is selected for fluid pressure supply thereto, a manually operated selector element for rotatably adjusting said distributing valve, said controlling devices being operated in direct response to said manual adjustment of said distributing valve, and manually controlled operating means for suplying fluid under pressure to said distributing valve independently of the aforesaid fluid supplying means.

24. In a power transmission, a plurality of controlling devices for relatively varying the speed and torque ratio of the drive through the transmission, a fluid pressure operated device for controlling each of said controlling devices, the fluid pressure operated device for one of said controlling devices delivering greater controlling force thereto than that delivered by another of said fluid pressure operated devices which controls a drive of relatively less speed reduction and torque multiplication, and means for selectively supplying a fluid under pressure to said fluid pressure operated devices.

25. In a power transmission, a plurality of controlling devices for relatively varying the speed and torque ratio of the drive through the transmission, a fluid pressure operated device for controlling each of said controlling devices, the fluid pressure operated device for one of said controlling devices delivering greater controlling force thereto than that delivered by another of said fluid pressure operated devices which controls a drive of relatively less speed reduction and torque multiplication, and means for selectively supplying a fluid under substantially the same pressure to said fluid pressure operated devices.

26. In a power transmission having a plurality of planetary gear sets and reaction brakes associated therewith for selectively varying the speed ratio drive through the transmission, a fluid pressure operator for actuating each of said brakes, means for selectively supplying fluid under pressure to said operators, said operators having relatively different brake actuating capacities, the operator for one of said brakes having a lesser capacity than that of another operator which is adapted to actuate a brake of a relatively greater reduction of speed ratio drive.

27. In a power transmission, a plurality of fluid pressure operated speed ratio controlling devices, a fluid pressure operator for each of said controlling devices, means for selectively distributing fluid under pressure to said operators, said distributing means including a valve structure and a casing structure therefor, said structures tending to be relatively displaced by the fluid, means for relatively adjusting said structures, and means for utilizing said fluid to oppose said displacing tendency.

28. In a power transmission, a plurality of fluid pressure operated speed ratio controlling devices, a fluid pressure operator for each of said controlling devices, means for selectively distributing fluid under pressure to said operators, said distributing means including a valve structure and a casing structure therefor, said structures tending to be relatively displaced by the fluid, means for relatively adjusting said structures, and means for utilizing said fluid to oppose said displacing tendency, said valve structure having a fluid passage and an outlet therefor, said displacement opposing means including an opening extending through said valve structure between said fluid passage and said casing structure, said opening extending in a direction opposite to the direction of said outlet.

29. In a power transmission, a plurality of fluid pressure operated speed ratio controlling devices, a fluid pressure operator for each of said controlling devices, means for selectively distributing fluid under pressure to said operators, said distributing means including a valve structure and a casing structure therefor, said structures tending to be relatively displaced by the fluid, means for relatively adjusting said structures, means for utilizing said fluid to oppose said displacing tendency, said valve structure having a fluid passage and an outlet therefor, said displacement opposing means including an opening extending through said valve structure between said fluid passage and said casing structure, said opening extending in a direction opposite to the direction of said outlet, and a piston within said opening exposed to the fluid in said passage and slidably engaging said casing structure.

30. In a power transmission having a plurality of planetary gear sets and reaction brakes associated therewith for selectively varying the speed ratio drive through the transmission, means acting to release said brakes, a fluid pressure operator for actuating each of said brakes, a fluid receiving cylinder, a piston for said cylinder, manually operated means for moving said piston from a normal position to a fluid pressure producing position, means for conducting said fluid under pressure from said cylinder selectively to said brake operators, and means for maintaining the brake of a selected speed ratio in actuated condition against release by said brake releasing means after said piston has returned from its pressure producing position to said normal position.

31. In a power transmission having a plurality of planetary gear sets and reaction brakes associated therewith for selectively varying the speed ratio drive through the transmission, means acting to release said brakes, a fluid pressure operator for actuating each of said brakes, a fluid receiving cylinder, a piston for said cylinder, manually operated means for moving said piston from a normal position to a fluid pressure producing position, and means for conducting said fluid under pressure from said cylinder selectively to said brake operators, said fluid conducting means including a check valve for maintaining the brake of a selected speed ratio in actuated condition against release by said brake releasing means after said piston has returned from its said pressure producing position to its said normal position.

32. In a power transmission of the planetary gear type having a plurality of speed ratio controlling brakes, a piston adapted to actuate each of said brakes, a cylinder for operably receiving each of said pistons, means including a distributing valve for conducting a fluid under pressure selectively to said cylinders, said distributing valve including a plate having a plurality of ports respectively communicating with said cylinders, said plate being disposed at an elevation greater than that of said cylinders whereby to maintain a level of said fluid substantially in the plane of said ports.

33. In a power transmission, a plurality of fluid actuated speed ratio controlling devices, a distributor valve chamber structure having a plurality of fluid conducting ports adapted to supply fluid to said controlling devices respectively, a valve structure within said chamber structure having an outlet port, means for moving said valve to place the port thereof selectively in communication with said fluid conducting ports, means for supplying fluid under pressure to said valve structure, and means for momentarily relieving the pressure of the fluid in said valve structure in response to movement thereof from a position of communication with any one of said fluid conducting ports to any other whereby to facilitate movement of said valve structure.

34. In a speed change transmission, a plurality of fluid pressure operated speed ratio controlling devices, fluid pressure operating means for each of said devices, a manually operable selector element for controlling the supply of fluid to said devices, an adjustable distributer valve operably connected to said selector element for selectively distributing the fluid to said devices, and means effective at least during said adjustment of the distributer valve and in response to operation of said selector element for counteracting the tendency of the fluid pressure to make adjustment of the distributer valve difficult.

35. In a speed change transmission, a plurality of fluid pressure operated speed ratio controlling devices, fluid pressure operating means for each of said devices, a manually operable selector element for controlling the supply of fluid to said devices, an adjustable distributer valve operably connected to said selector element for selectively distributing the fluid to said devices, and means effective at least during said adjustment of the distributer valve and in response to operation of said selector element for counteracting the tendency of the fluid pressure to make adjustment of the distributer valve difficult, said distributer valve having a hollow stem about which said valve is adjusted and through which the fluid is admitted to the valve and a hollow chamber extending in a direction transversely to said stem from which the fluid is delivered.

HERBERT F. PATTERSON.